United States Patent [19]

Fournier et al.

[11] Patent Number: 5,293,395
[45] Date of Patent: Mar. 8, 1994

[54] STIMULATED RAMAN LASER OF AMPLIFIER USING AXICON PUMPING

[75] Inventors: Georges R. Fournier, Quebec; Pierre J. P. R. Mathieu, Cap-Rouge, both of Canada

[73] Assignee: Her Majesty the Queen as represented by the Minister of National Defence of Her Majesty's Canadian Government, Ottawa, Canada

[21] Appl. No.: 44,575
[22] Filed: Apr. 6, 1993

[30] Foreign Application Priority Data

Aug. 24, 1992 [CA] Canada ................................. 2076735

[51] Int. Cl.$^5$ .............................................. H01S 3/30
[52] U.S. Cl. ......................................... 372/3; 372/98; 372/93; 372/103
[58] Field of Search ................... 372/3, 92, 93, 98, 103

[56] References Cited
FOREIGN PATENT DOCUMENTS 2074125  1/1993  Canada .

Primary Examiner—Léon Scott, Jr.
Attorney, Agent, or Firm—Larson & Taylor

[57] ABSTRACT

A raman cell oscillator/amplifier arrangement comprising a cell containing a raman high pressure gas or liquid medium with an axicon being located at each end of the cell, one axicon having an input window for a laser pump beam and the axicon at the cell's other end having an output coupler for the raman process converted beam. The axicons directs the laser pump beam towards an extended line focus along the axis of the cell at a shallow angle, the extended line focus for each axicon being collinear with each other to produce an extended raman gain region. By suitable design, it can be ensured that the pump beam energy density at focus is lower than either an optical breakdown or Brillouin backscatter threshold. This provides a means of efficiently producing a raman laser or amplifier having an extended raman gain region without developing problems of optical breakdown, Brillouin backscattering or self-focusing in the case of a liquid raman media.

21 Claims, 3 Drawing Sheets

STIMULATED RAMAN LASER OF AMPLIFIER USING AXICON PUMPING

FIELD OF THE INVENTION

Stimulated raman scattering can be achieved by passing a high intensity laser beam through a high pressure gas or liquid medium which shifts the laser wave length by an amount which is dependent on the type of material forming the medium. The optical gain of this system is a function of the intensity of the pump laser beam. However, other effects result if the beam is sufficiently intense such as Brillouin backscattering, optical breakdown or self-focusing which prevents efficient conversion. The present invention is directed to a system and method which allows for efficient lasing or amplification and substantially reduces the threshold for Brillouin backscattering, optical breakdown and self-focusing.

BACKGROUND OF THE INVENTION

Raman shifting is generally done by focusing a pump laser beam in a cell containing a high pressure gas or a liquid. A hollow tube with reflecting walls and a diameter of the same order as that of the focused laser beam may be inserted, in some cases, in the raman cell which tube serves to contain the pump beam and lengthen the gain zone. High repetition rate operation may require some means of gas recirculation for some raman media in order to minimize optical distortions caused by heat absorbed in the raman conversion process.

The main limitation of present pumping method is that when one uses a high enough pump power density to ensure efficient raman conversion, the raman medium suffers from what is known as optical breakdown. This will result in the raman gain going to zero with lasing or amplification stopping immediately once such a breakdown occurs. A second, particularly serious, limitation when one uses a narrow line-width pump laser is the onset of Brillouin backscattering which efficiently reflects the pump laser beam back to the source and also prevents further raman conversion. Precautions must be taken against this second limitation in order to protect the laser pump source from damage due to the reflected radiation, such as the use of expensive Faraday rotators. Another limitation in liquids is the self-focusing of the pump beam in a liquid raman medium. This phenomenon has prevented the use of many liquids for efficient raman conversion since the self-focusing can seriously damage optical components and even break the windows of the cell containing the raman liquid.

SUMMARY OF THE INVENTION

A laser pumping scheme, according to the present invention, uses conical reflecting or refracting optical elements known as axicons at either end of a raman cell. These elements have the fundamental property of producing an extended line focus from a point source and can be designed to avoid the above-mentioned limitations in many cases.

In one preferred embodiment of the invention, a raman cell acting as a laser oscillator or amplifier comprises an enclosed cell containing a raman medium with an axicon being located on an optical axis at each end of the cell, one axicon having an input window for a laser pump beam and a second axicon at the cell's other end being provided with an output coupler for raman radiation, each axicon being shaped to direct energy from the laser pump beam towards an extended line focus along said optical axis, the extended line focus for each axicon being substantially collinear with each other forming an extended raman gain region.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
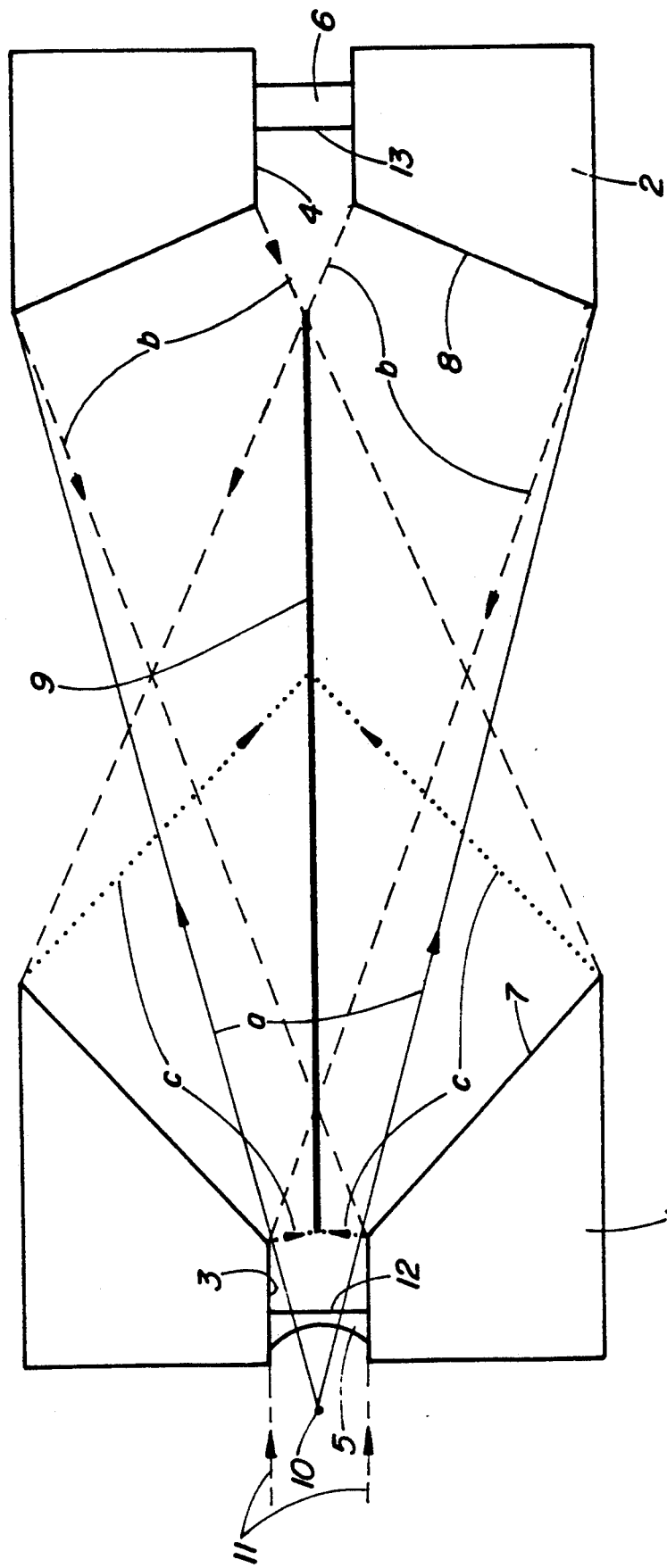
FIG. 1 illustrates one embodiment of a raman oscillator according to the present invention.

FIG. 1 illustrates a raman oscillator (laser) according to one embodiment of the invention in which a pump laser beam 11 is sent into the raman cell from the left side, passing through a diverging lens 5 located in a central opening 3 of an axicon 1. The virtual image point of lens 5 is shown at 10. Another axicon 2 is located at the other, right hand, end of the cell. Axicon 2 has a central opening 4 in which a partially reflecting mirror 13 on window 6 is located forming an output coupler. Axicon 2 has a reflecting mirror on an internal conical surface 8. The laser beam 11 first passes through the diverging lens 5 and expands through the cell as shown by lines "a" until it reaches reflecting axicon 2. The conical reflecting surface 8 of axicon 2 reflects the beam to the left and towards the axis as illustrated by dashed lines "b" to create an extended line focus at the axis of the cell along a pumped gain zone 9. Whatever pump beam energy is not converted by the raman process in this first pass continues on to axicon 1 which has an inner conical surface 7 with a reflecting mirror on that surface. Axicon 1 is located on the left side of the raman cell. The conical reflecting surface 7 reflects the remainder of the beam a second time to the right and towards the axis as shown by dotted lines "c". This creates a second extended line focus along zone 9 which is collinear with the first line focus formed by axicon 2. This second line focus can be either superimposed on or longitudinally displaced from the first line focus depending on the slope of the conical reflecting surfaces 8 and 7. This choice will depend on the breakdown threshold of the raman medium since it must be ensured that the pump beam energy density at focus is lower than either the breakdown threshold or Brillouin backscatter threshold in all cases.

It should be noted that since the raman process is due to a dipole interaction, the resulting optical gain follows a cosine squared dependence about the pump direction which means that side pumping is not a feasible option in a raman oscillator or amplifier. This also means that the light reflected back from the axicon should be at a small angle with respect to the raman laser or amplifier axis in order not to lower the raman gain unduly. It has been found that an angle of less than 30° is generally acceptable.

A raman laser operates at maximum efficiency when the resonator is designed to operate at the limits of stability. This increased efficiency results from the marginal rays being able to efficiently extract the energy available at large diameters if the resonator is at the stability limit. There are many possible resonator configurations which can be designed to operate at the stability limit, such as a concentric resonator and a plane-plane resonator. In the plane-plane configuration shown in FIG. 1, a first mirror surface 12 is the inner back plane of the input diverging lens 5. This first mirror consists of a dichroic coating which transmits nearly 100% of the pump laser radiation, while reflecting nearly 100% of the raman radiation. The output coupler 13 is a partially reflecting mirror on the inside face of the right-hand side window 6, which mirror has an optimum reflectivity of 20% to 30%. However, these values should be optimized for every case with the ones given being only considered as useful guidelines.

Misalignment of the extended line foci of the axicons should not exceed more than 20% of the diameter of the central focal spot at its smallest value since their alignment is critical for the proper functioning of the device. The ratio of the outer diameter of the axicons 1 and 2 to that of their central openings 3 and 4 should be kept large in order to lose no more pump energy than is absolutely necessary. This ratio should be at least 4 and preferably 5 at a minimum.

If there are no other practical constraints, the length of the cavity should be such that the angle of the reflected pump radiation is smaller than 30°, at least as a first approximation. The diameter of the focal line of an axicon is a function of the apex angle of the axicon and the length of the focal line. The parameters of a cavity must, of course, be chosen such that the expected energy density from the raman laser or amplifier does not exceed either the damage threshold of the optics at the ends of the cavity or, in the case of liquids, the self focusing threshold.

The relative energy distribution as a function of radius r of a reflective axicon is given, as a first approximation, by:

$$I(r) = AJ_0^2 \frac{2k\alpha lr}{l + l'}$$

where A is a normalization constant, $J_o$ is the Bessel function of order zero, l is the distance from the virtual image point of the pump source to the apex of the axicon, $l'$ is the distance from the apex of the axicon to the observation point, $\alpha$ is the angle in radians between the wall of the axicon and the normal to the optical axis of the system, r is the radius and $k=2\pi/\lambda$, with $\lambda$ being the wavelength of the raman radiation in the same units as l, $l'$ and r. All of the pump radiation should be assumed, at least to a first order, to be contained within a cylinder of the length of the focal zone of the axicon and of a radius equal to the first minimum of the Bessel function of order zero evaluated at an $l'$ corresponding to the middle of the focal zone.

Figure 2:
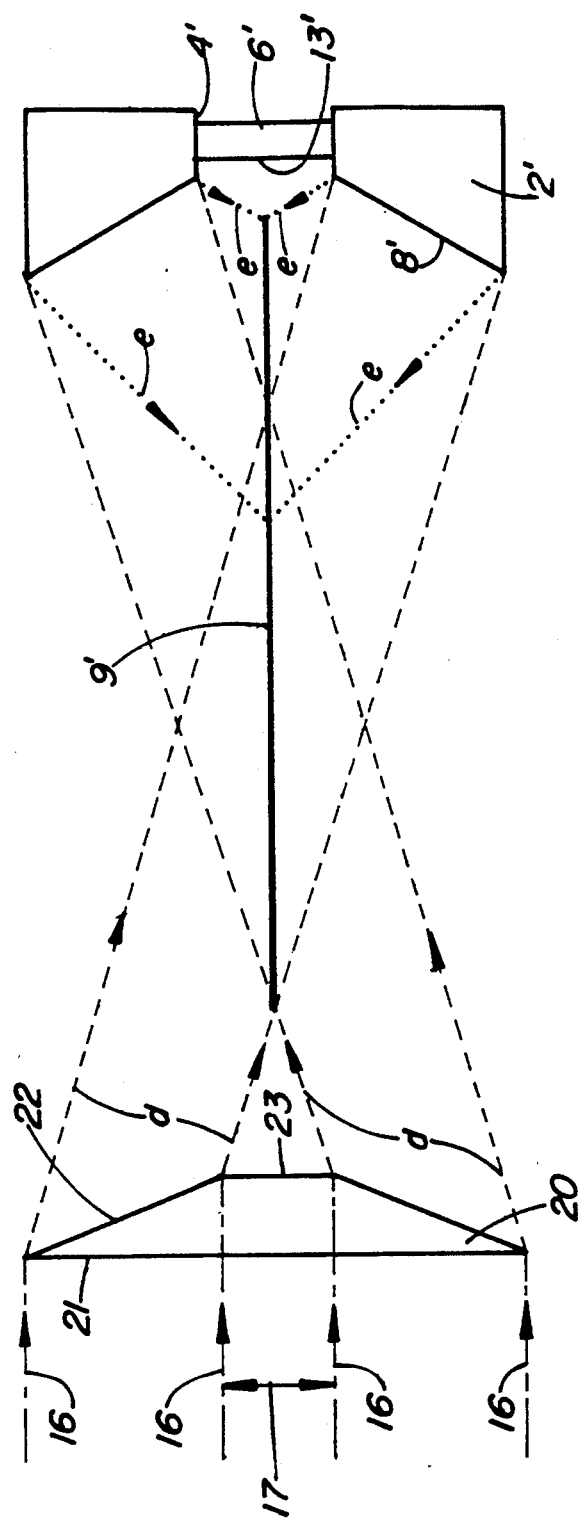
FIG. 2 illustrates the design of a raman oscillator, according to another embodiment of the present invention, based on a refractive or transmissive axicon as the first element.

FIG. 2 illustrates a raman oscillator, according to another embodiment of the present invention, which is based on a refractive or transmissive axicon 20 as the first element. This type of configuration is useful when the pump laser beam 16 is hollow and has a hole 17 in the middle of the beam. The transmissive axicon 20 can be used as a first element due to the hole 17 in the cylindrical beam 16. Transmissive axicon 20 has the shape of a truncated cone with the cylindrical laser pump beam 16 being directed towards the flat base 21 and refracted by conical surface 22, as shown by dashed lines "d", towards the axis. This refracted beam forms a first extended line focus at the laser pumped gain zone 9'. Any pump beam energy which is not converted by the raman process in this first pass, to the right, through the cell passes onto axicon 2' with a conical reflecting surface 8'. The axicon 2' is similar to axicon 2 in FIG. 1 with a reflecting mirror on an inner conical surface 8' and a central opening 4' containing a window 6' on which an inner partially reflecting mirror 13' is located forming an output coupler. In FIG. 2, axicon 2' reflects any unconverted beam energy, as shown by dotted lines "e", back towards the pumped gain zone 9' for a second pass, to the left, through the cell forming a second extended line focus along zone 9' which is collinear with the first line focus formed by axicon 20. A mirror coating which is nearly 100% reflective for the raman wavelength is located on the flat truncated surface 23 of the transmissive axicon 20, the surface 23 being perpendicular to the optical axis and pumped gain zone 9'.

Figure 3:
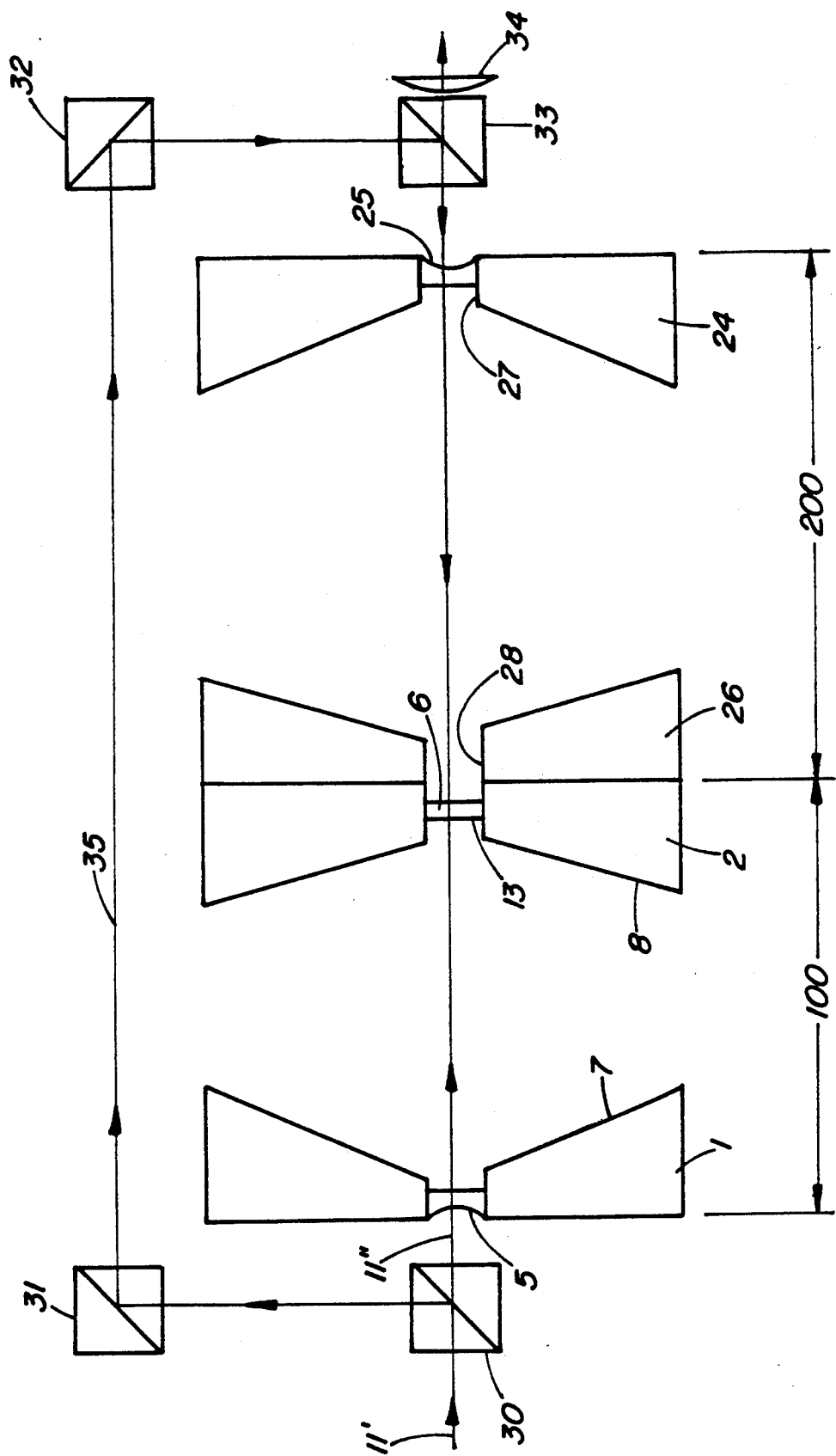
FIG. 3 illustrates a master oscillator/power amplifier arrangement according to a further embodiment of the invention.

A master oscillator power amplifier is shown in FIG. 3 wherein a portion 11" of a pump laser beam 11' is transmitted through a first beamsplitter 30 to pump a raman oscillator 100 (elements 1, 2, 5 and 6) of the same type as shown in FIG. 1. The rest of the pump laser beam from beamsplitter 30 is sent through an optical delay line 35 formed by reflecting prisms 31, 32 and a further beam splitter 33 which reflects the remainder of the pump beam to pump a raman amplifier 200, consisting of axicons 26 and 24, through the diverging lens 25. The diverging lens 25 is located in a central opening 27 in axicon 24 at the right hand side of amplifier 200. A central opening 28 in axicon 26 provides an input to raman amplifier 200 which is aligned with the output coupler (mirror 13 on window 6) of the raman oscillator 100. The length of the optical delay line 35 should match the buildup time of the raman oscillator 100 in as far as possible. The alignment of the focal lines of the axicons for both the oscillator and amplifier is critical for proper functioning of the device. The diverging lens 25 at the exit of the amplifier 200 will cause the raman beam to strongly diverge. Therefore, in this case, a final collimating lens 34 is required for the raman radiation.

Enclosures which surround the raman oscillators or amplifiers and serve to contain the high pressure gaseous media or the appropriate medium, such as a liquid, used for raman shifting have not been shown in the Figures for the sake of clarity. Neither have well known means been shown for recirculation of the gases or liquids which would be used when a high pulse repetition rate is desired along with a good output beam optical quality.

The embodiments described provide a means of efficiently producing a raman laser or amplifier by using axicons in order to produce an extended raman gain region without developing the problems of optical breakdown, Brillouin backscattering or self-focusing. The pumping action using axicons is not strictly collinear, as in present methods, but it can be made to occur at a shallow enough angle with respect to the optical axis so that very little penalty in terms of raman gain occurs. The practical problem of fabricating axicons is taken into consideration by first expanding the pump beam with a diverging lens, and then using reflective axicons which can be manufactured, using a diamond optical lathe. A refractive axicon is only used in the case where the laser pump beam is hollow.

Various modification may be made to the preferred embodiments without departing from the spirit and scope of the invention as defined in the appended claims.

The embodiments of the invention in which an exclusive property or privilege is claimed are defined as follows:

1. A raman cell comprising an enclosed cell containing a raman medium with an axicon being located on the cell's optical axis at each end of the cell, one axicon having an input window for a laser pump beam and a second axicon at the cell's other end being provided with an output coupler for raman radiation, each axicon being shaped to direct energy from the laser pump beam towards an extended line focus along said optical axis, the extended line focus for each axicon being substantially collinear with each other forming an extended raman gain region.

2. A raman cell as defined in claim 1, wherein each axicon has a conical shape with an apex angle that directs energy from the laser pump beam towards the optical axis at a shallow angle.

3. A raman cell as defined in claim 2, wherein the shallow angle is less than 30°.

4. A raman cell as defined in claim 3, wherein any misalignment between the extended line focus for each axicon is less than 20% of the diameter of the central focal spot at its smallest value.

5. A raman cell as defined in claim 4, wherein the extended line focus for each axicon partially overlaps the extended line focus of the other axicon, those extended line focus being longitudinally displaced from each other along the axis forming said extended raman gain region.

6. A raman cell as defined in claim 5, wherein the input window is a diverging lens located in a central opening in said one axicon, the diverging lens having a form to expand and direct radiation from an input laser pump beam towards an inner conical reflecting surface of said second axicon, an extension of that conical reflecting surface having an apex on the optical axis and being at an angle to the optical axis that will reflect radiation received from the diverging lens back towards the optical axis forming a first extended line focus at the optical axis.

7. A raman cell as defined in claim 6, wherein any unconverted radiation reflected by the second axicon will continue in a direction towards an inner conical reflecting surface of said one axicon, an extension of that inner conical surface having an apex on the optical axis, that reflecting surface being at an angle to the optical axis that will reflect any unconverted radiation back towards the optical axis forming a second extended line focus at the optical axis.

8. A raman cell as defined in claim 7, wherein the output coupler is a partially reflecting coating for raman radiation on a flat inner surface of a transparent window positioned on the optical axis in a central opening in the second axicon.

9. A raman cell as defined in claim 8, wherein the partially reflecting coating has an optimum reflectivity of 20% to 30%.

10. A raman cell as defined in claim 9, wherein the diverging lens has a flat inner surface, a dichroic coating on said flat inner surface being provided which transmits nearly 100% of a laser pump beam while raman radiation is nearly 100% reflected by the dichroic coating.

11. A raman cell as defined in claim 10, wherein a ratio of an outer diameter of each axicon to the diameter of that axicon's central opening is at least 4.

12. A raman cell as defined in claim 5, wherein said one axicon is a transmission axicon having the shape of a truncated cone whose base forms said input window for a cylindrical shaped laser pump beam, the cone's truncated top having a diameter substantially equal to the inner diameter of the cylindrical beam, said one axicon's conical surface refracting a laser pump beam towards said optical axis forming a first extended line focus at the optical axis.

13. A raman cell as defined in claim 12, wherein any radiation refracted by said one axicon that remains unconverted will continue in a direction towards an inner conical reflecting surface of the second axicon, an extension of that conical surface having an apex on the optical axis and being at an angle to the optical axis that will reflect any unconverted radiation back towards the optical axis forming a second extended line focus at the optical axis.

14. A raman cell as defined in claim 13, wherein the truncated cone's top is flat and perpendicular to the optical axis, the top being provided with a raman wavelength reflecting coating.

15. A raman cell as defined in claim 14, wherein the output coupler is a partially reflecting coating for raman radiation on a flat inner surface of a transparent window located on the optical axis in a central opening of the second axicon.

16. A raman cell as defined in claim 15, wherein the partially reflecting coating has an optimum reflectivity of 20% to 30%.

17. A raman cell as defined in claim 16, wherein the ratio of the second axicon's outer diameter to the diameter of its central opening is at least 4.

18. A raman cell as defined in claim 17, wherein the ratio of said one axicon's outer diameter to the diameter of its truncated top is at least 4.

19. A master oscillator power amplifier arrangement comprising an input raman cell as defined in claim 8 forming an axicon pumped raman oscillator wherein a laser pump beam is directed through a first beamsplitter to said input window, the first beamsplitter directing a portion of the pump beam to an optical delay line and through a second beamsplitter to a further window of a raman amplifier, the raman amplifier comprising a third axicon at one end of a second raman cell, the third axicon having a central opening aligned with and adjacent to the central opening in the second axicon to couple said raman amplifier to the output coupler of said raman oscillator, the further window of the raman amplifier being a further diverging lens located in a central opening of a fourth axicon located at the other end of said second raman cell, the further diverging lens directing a beam from the second beamsplitter towards the third axicon, the third and fourth axicon being shaped to direct radiation towards an extended line focus along an optical axis of the second raman cell forming a further extended raman gain region, which optical axis is aligned with the optical axis of the axicon pumped raman oscillator, an output from said raman amplifier exiting through said further diverging lens.

20. A master oscillator power amplifier arrangement as defined in claim 19, wherein the length of the delay line provides a delay that substantially matches the buildup time of a raman oscillator.

21. A master oscillator power amplifier arrangement as defined in claim 19, wherein an output from said further diverging lens transverses said second beam splitter to a collimating lens.

* * * * *